US006221296B1

(12) United States Patent
James et al.

(10) Patent No.: US 6,221,296 B1
(45) Date of Patent: Apr. 24, 2001

(54) METHOD OF MAKING A MAGNETICALLY ENCODABLE CARD HAVING MAGNETIC PARTICLES UNIFORMLY DISTRIBUTED THROUGHOUT

(75) Inventors: Robert Owen James; Mary-Irene Elizabeth Condo, both of Rochester, NY (US); Bradford Drake West, San Diego, CA (US); Lawrence Allen Rowley, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/418,731

(22) Filed: Apr. 7, 1995

(51) Int. Cl.⁷ .............................. B29B 7/32; B29C 47/00
(52) U.S. Cl. ...................... 264/153; 264/176.1; 264/300; 264/328.1; 264/331.11
(58) Field of Search ................... 360/131, 2; 264/113, 264/109, 122, 125, 126, 138, 145, 153, 176.1, 300, 328.1, 330, 331.11; 428/900

(56) References Cited

U.S. PATENT DOCUMENTS

| 3,601,913 | 8/1971 | Pollock | 40/2.2 |
|---|---|---|---|
| 3,808,404 | * 4/1974 | Riggs | 360/131 |
| 3,860,796 | 1/1975 | Wallace et al. | 235/61.12 M |
| 3,902,262 | * 9/1975 | Colegrove et al. | 283/82 |
| 3,975,574 | 8/1976 | Saluke | 428/483 |
| 4,243,698 | * 1/1981 | Marzel et al. | 427/157 |
| 4,444,670 | 4/1984 | Moslener | 252/62.54 |
| 4,459,253 | * 7/1984 | Marcar et al. | 428/900 |
| 4,522,428 | 6/1985 | Small et al. | 283/82 |
| 4,871,503 | * 10/1989 | Ishii et al. | 264/248 |
| 5,082,717 | * 1/1992 | Yaguchi et al. | 428/207 |
| 5,082,730 | * 1/1992 | Takeda et al. | 428/336 |
| 5,113,062 | * 5/1992 | Fujita et al. | 235/493 |
| 5,151,333 | * 9/1992 | Kitahara et al. | 428/694 |
| 5,217,804 | * 6/1993 | James et al. | 428/329 |
| 5,235,243 | 8/1993 | Tong | 313/479 |
| 5,272,216 | 12/1993 | Clark, Jr. et al. | 525/362 |
| 5,397,826 | * 3/1995 | Wexler | 524/356 |

FOREIGN PATENT DOCUMENTS 2829778   1/1980   (DE) .

* cited by examiner

*Primary Examiner*—Jan H. Silbaugh
(74) *Attorney, Agent, or Firm*—Doreen M. Wells

(57) ABSTRACT

A method of making a magnetically encodable card which comprises forming a dispersion of ferromagnetic particles in an organic fluid medium, forming a composite by intimately combining the dispersion with a thermoplastic resin plasticized by the organic fluid medium and forming the composite into an encodable card.

24 Claims, No Drawings though of the invention relates in general to information cards such as credit cards, debit cards, personal I.D. cards, employee passes, door and gate opening magnetic keys, etc. More particularly, this invention relates to a method of making magnetically encodable information cards of solid plastic, having magnetic particles uniformly distributed throughout the plastic.

BACKGROUND OF THE INVENTION

Identification cards such as credit cards, debit cards, personal identification cards, employee passes, and the like, have typically contained a magnetic stripe on the back, to record unique information about the owner of the card. Such information can include the credit or debit card number, a personal identification number, an employee number, as well as other information relating to the person and to the application of the card. It can also contain encoded information to cause doors or gates to unlock or open. One disadvantage of using a magnetic stripe is that it is clearly visible and easy to change or erase the recorded information. Another disadvantage is that continued use of the card by swiping of the magnetic stripe through a reader causes degradation of the magnetic stripe and information recorded thereon. A further disadvantage is the limited recording capacity of the single magnetic stripe.

There is thus a need to provide a method of making a magnetic information card having magnetic particles uniformly dispersed throughout without interfering with the neutral reflection density of the card without the presence of the magnetic particles.

SUMMARY OF THE INVENTION

According to the present invention, there is provided a method of making a magnetically encodable card having ferromagnetic particles uniformly dispersed throughout by forming a dispersion of ferromagnetic particles in an organic fluid medium, intimately combining the dispersion with a thermoplastic resin, the thermoplastic resin being plasticized by the organic fluid medium to form a composite, and fabricating the composite into a magnetically encoded card. According to still another aspect of the present invention, the magnetically encodable card also may have dispersed therein various materials such as, abrasive particles, lubricants, dyes, and pigments that provide a reflective background so that pictorial information can be printed on a face of the card.

DESCRIPTION OF PREFERRED EMBODIMENTS

Thus, the invention contemplates a method of making magnetically encodable cards by the steps outlined above. These cards, because of their nature, demonstrate improved endurance over prior art cards in that they do not delaminate, the magnetic signal is not diminished as a result of abrasion due to multiple passes through readers, and that the information can be encoded into the card in any desired direction or configuration as the magnetic particles are uniformly dispersed throughout.

By "uniformly dispersed throughout" is meant that the signal envelope of the card is as described in copending U.S. patent application Ser. No. 08/418,336 filed Apr. 7, 1995. by T. Jagielinski, F. Jeffers, and R. O. James, and commonly assigned.

The phrase "uniformly dispered throughout", as applied to the card made by the process of this invention, is defined by means of a d.c. magnetization measurement test. In the test, a magentically encodable card is uniformly magnetized with a high or saturated d.c. field, for example, at 11 kilooersted, with the field parallel to the length of the card. The card then is passed through a card reader and the resultant signal analyzed. If magnetic particles are present in large, non-uniform, aggregates, the aggregates act as a large local magnetic dipole and when the card is passed through a card reader, the higher flux changes attributable to the aggregates causes a higher RMS (root mean square) signal. Conversely for small, well-dispersed and distributed particles, the local flux changes are much smaller and when such a card is passed through a card reader, the signal is much smaller and less variable resulting in a small RMS signal. When tested in this way, cards that have the magenetic particles uniformly distributed throughout have a RMS voltage above the system noise level, i.e., above 4 mV RMS, and below 2 OmV RMS.

In accordance with the invention, any suitable ferromagnetic particle may be employed such as, for example, $\gamma$-$Fe_2O_3$, Co-$\gamma$-$Fe_2O_3$, Co-magnetite; ferromagnetic chromium dioxide, ferromagnetic metal particles, ferromagnetic alloy particles, barium ferrite, strontium ferrite, and the like. It is preferred that the magnetic particles have a coercivity greater than 3,000 Oe, therefore, barium ferrite and strontium ferrite are preferred. It is also preferred that the volume of magnetic particle in the card be less than 0.1 percent and most preferably less than 0.03 percent based upon the volume of the resin employed in making the card. This is preferable because the low density of the magnetic particle allows the achievement of a neutral reflection density of the card, thereby permitting indicia, images, polygrams, and the like on the card without having the interference of color from the presence of the magnetic particles. The loading of the magnetic particles into the resin from which the card is formed in these small percentages gives a low remanant field and thus prevents the card made in accordance with this invention from operating as a master media card which would readily permit the counterfeiting of lower coercivity cards because of the high coercivity of the material employed.

The ferromagnetic particles are dispersed in an organic fluid medium which when combined with a thermoplastic resin serves to plasticize the resin. Any suitable organic fluid medium having this characteristic may be employed in the method in accordance with this invention such as, for example, phosphate esters such as tricresyl phosphate; glycol esters, such as diethylene glycol mixed esters; phthalate esters such as dibutyl phthalate, dipropyl phthalate, dioctyl phthalate, and the like; alkyl stearates such as hexyl stearate, and butyl stearate; tetraethylene glycol dimethyl ether, ethyl acetate copolymers, lactams, lower alkyl esters of ethylene bis-glycolic acid, ether esters, or diesters of an alkylene glycol or a polyalkylene glycol, polyacrylic acid esters, polyvinyl acetate, and the like. The phthalate esters, particularly dibutyl phthalate is preferred. The plasticizer serves not only to provide for a uniform dispersion of the ferromagnetic particles in the organic fluid medium, but also enhances the flexibility of the card, thereby reducing embrittlement.

In the preparation of the dispersion of ferromagnetic particles in the organic fluid medium, it is preferred that a dispersing agent be included. Suitable dispersing agents include fatty acid amines, and commercially available wetting agents such as Witco Emcol CC59 which is a quaternary amine available from Witco Chemical Corp. Rhodafac PE 510, Rhodafac RE 610, Rhodafac RE 960, and Rhodafac LO 529 which are phosphoric acid esters available from Rhone-Poulenc. Further, the dispersing agent as set forth in U.S. Pat. No. 5,395,743 which is sold by Zeneca Inc. under the trade designation Solsperse 24000 is preferred. Mixtures of the above-mentioned dispersing agents can also be employed.

After the dispersion of the ferromagnetic particles in the organic fluid medium is formed, a composite is next prepared by mixing the dispersion with a thermoplastic resin. Any suitable thermoplastic resin may be employed such as, for example, polystyrene, polyamides, homo and copolymers of vinylchloride, polycarbonates, homo and copolymers of polyolefins, such as polyethylene, polypropylene, copolymers of ethylene and propylene; polyesters such as those prepared from dibasic carboxylic acids and divalent alcohols including succinic acid, dipic acid, phthalic acid, terephthalic acid, naphthalene dicarboxylic acid, and the lower alkyl esters thereof, and suitable glycols such as, for example, ethylene glycol, propylene glycol, butylene glycol, 1,4-cyclohexane dimethylol, polytetramethylene ether glycol, and the like; polyurethanes, and the like. Particular polyesters for use as a thermoplastic resin in accordance with this invention include polyethylene terephthalate, polyethylene naphthalate, and a copolymer of 1,4-cyclohexane dimethylol and ethylene glycol with terephthalic acid wherein the 1,4-cyclohexane dimethanol is used in a major amount.

Suitable pigments including metal oxides or mixtures of oxides, metal carbonates, and the like may be added to either the dispersion or to the compositing step in accordance with this invention in order to provide a bright white reflective surface suitable for receiving indicia, images, and the like including, titanium dioxide either in the anatase or rutile form, zinc oxide, silica, aluminum oxide, zirconium oxide, tin oxides, nacreous pigments, such as mica/titanium dioxide or bismuth oxychloride, calcium carbonate, and the like. The thermoplastic material for the preparation of the information cards in accordance with this invention may also have dispersed therein particles that impart abrasion resistance and durability to the surface of the card for cleaning magnetic transducer heads so that digital information may be exchanged more reliably. Suitable such materials include powders, which are dispersed either into the dispersion or into the thermoplastic composite in accordance with the method of this invention such as, alpha alumina, gamma alumina, polycrystalline alpha-gamma alumina, aluminosilicates, titanium dioxide, silica, tin oxide, antimony doped tin oxide, zirconium dioxide, chromium oxide, silicon nitride, and other powdered materials having a hardness generally greater than 6 on the MOH's scale.

The process in accordance with this invention also contemplates the inclusion of colored pigments or dyes to balance the optical reflection density in the visible region, thereby to provide desirable optical effects, including neutral density reflection for high light areas in image or pictorial information printed on the face of the information card such as blue dyes or pigments such as cobalt blue #3, ultramarine blue, antimony doped tin oxide, or magenta dyes or pigments, such as, for example, quinacridone magenta.

It may be desirable to employ an optical brightener that may be added in any step of the method in accordance with this invention. Suitable optical brighteners include thiophenes as set forth in U.S. Pat. Nos. 3,449,257 and 3,501,298; stilbenes as set forth in U.S. Pat. No. 4,794,071; triazines as disclosed in U.S. Pat. No. 2,713,046; imidazolones as disclosed in U.S. Pat. Nos. 2,571,706 and 2,723,197; pyrazolines as disclosed in UK Patent No. 669,590 and 712,764; and the like. Additional optical brighteners disclosed in *Research Disclosure* 308119, December 1989 in Section 5 may also be employed in the practice of this invention.

In order to provide low friction, sliding contact, between the card and the head or transducer in the card reader or card writer, and thereby reduce surface scratching or marring, suitable lubricants may be incorporated therein, such as, for example, long chain fatty acids or esters thereof, such as, for example, stearic acid, metal stearates including zinc stearates, sodium stearate, calcium stearate, and the like; polytetrafluoroethylene particles, silicone derivatives, and polymeric silicone compounds, such as polydimethylsiloxane, paraffin, carnauba wax, and the like.

Any suitable antioxidant may be added to either the dispersion or to the thermoplastic resin prior to forming the composite into an encodable card such as, for example, octadecyl 3(3',5' ditertbutyl 4' hydroxyphenyl) propionate (Irganox 1076); stearyl erucamide; butylated hydroxy toluene; butylated hydroxyanisole; 2,6-ditertbutyl-p-cresol, tetrakis[methylene 3-(3',5'-ditertbutyl-4'-hydroxyphenyl propionate] methane; 2,2'-thiobis(6-tertbutyl-4-methyl phenol); tris(nonylphenyl)phosphate; distearylpentaerythritol diphosphite; and the like.

According to the present invention, the magnetic particles are present at very low concentrations in the body of the plastic card. In order to provide a uniform signal envelope and appropriate resolution of flux reversals, it is important to provide uniform dispersion of deaggregated magnetic powder particles throughout the body of the card and across the surfaces and along the edges of the card.

This method described here and in detail in the following examples can be used for the incorporation of magnetic particles, reflective particles, abrasive particles, lubricants, and dyes into the plastic card material. This method is based on making a predispersion of the desired component particle in an organic fluid medium that is also a polymer compatible plasticizer. Such predispersions provide high concentrations of particles that are composed mostly of single crystallites. When small quantities of these dispersions are mixed with polymer pellets or chips in a compounding apparatus, the oxide particles are easily and uniformly distributed throughout the polymer melt. The molten polymer is extruded from the compounder, chilled and pelletized to provide polymer pellets containing the magnetic particles, reflective particles, abrasive particles, dyes, and other desired components. These filled polymer pellets are then used as the feedstock for a sheet extrusion machine or an injection molding machine to form a plastic sheet about 760 $\mu$m (30 mils.) thick. If sheet extrusion is used, then cards are punched from the sheet using a die set of desired size. If injection molding is used, the cards are molded to the desired size and then trimmed.

Dispersion Methods

Two small media dispersion methods are used to disperse the particles in the organic fluid plasticizer. In the first, the magnetic particles such as strontium ferrite are dispersed in dibutyl phthalate containing a dispersant using an Eiger Machinery Inc. 250 cc. mill having stainless steel media (Chromanite, 1.3 mm beads) loaded to 90% by volume in the agitation chamber, using a shaft speed of 4,000 rpm for 7 hours.

In the second method the white reflective and abrasive pigments are placed in a glass walled vessel with dibutyl phthalate, a dispersant and zirconia/silica beads of 0.8 to 1.2 mm diameter.

The vessels are sealed and placed on a roller apparatus for 36 to 96 hours. In this second method, the white pigments are not discolored by the milling process.

For all particulate materials, the particle size is monitored using centrifugal size analysis (Shimadzu CP-SA3) and milling is stopped when the particle size is the same as or close to the manufacturer's equivalent particle size based on the specific surface area or other method.

Compoundina Method

The desired materials are mixed and compounded using a Welding Engineers Inc. twin screw compounding machine. This machine is a counter-rotating, non-intermeshing compounder. The melt temperature is 219° C. (426° F.). The barrel profile range for the extruder is 196 ° C. (384° F.) to 213° C. (415 ° F.). A double reverse flight compounding section is added to the screw profile of the twin screw compounder to improve polymer-additive mixing through intense shear. This should also improve the dispersion and distribution of the magnetic and other particles as well.

The major groups of components for the compounding steps are:

1. PCTG 5445 pellets, a polyester copolymer of dimethyl terephthalate and ethylene glycol and 1,4-cyclohexanedimethylol sold by Eastman Chemical Company.
2. Pellets of 1 above containing 50 weight percent $TiO_2$, and
3. Smaller amounts of the dispersions of the additives including the magnetic particles, the abrasive particles, reflective particles, and dyes, etc. When the compounding is completed, to form the composite, the filled polymer is extruded as through a multi-orifice die, chilled, and pelletized to provide the feedstock for a forming card shape.

Card Formation

The filled polymer pellets are injection molded using a 250 ton VanDorn injection molding machine. The mold used is an ASTM plague, thickness 0.030"1, 3", long and 2", wide. The melt temperature range for all formulations is in the range 232° C. (450° F.) to 260° C. (500° F.).

The invention is further illustrated by the following examples in which parts and percentages are by weight unless otherwise indicated.

EXAMPLE 1

A 40% dispersion of strontium ferrite (Hoosier Secure Mag H, $H_c$ 4400 Oe) in ethylene glycol is prepared in a 250 cc Eiger mill at 4000 rpm according to the following proportions:

|  | Amount (g) |
| --- | --- |
| Strontium Ferrite | 280.0 |
| Polyethylene Glycol (Kodak, PEG 400) | 11.2 |
| Ethylene Glycol | 408.8 |
|  | 700.0 |

The chemical composition of the strontium ferrite is approximately $SrFe_{12}O_{19}$ made by Hoosier Magnetics Group: Washington Plant, Ind.

Part of this dispersion is blended into the natural PCTG polyester and the 50/50 $TiO_2$/PCTG concentrate set forth above and then compounded to provide pellets of the following composition.

|  | Percent (%) |
| --- | --- |
| $TiO_2$ (DuPont Rutile R-100) | 15.000 |
| $SrFe_{12}O_{19}$ | 0.132 |
| Ethylene Glycol | 0.198 |
| Polyester PCTG | 84.670 |
|  | 100.000 |

These pellets are injection molded to form cards 0.030"× 3"×2" for testing.

EXAMPLE 2

A 45% dispersion of same strontium ferrite as in Example 1 in dibutyl phthalate (DBuPh) is prepared in a 250 CC Eiger mill at 4000 rpm according to the following proportions:

|  | Amount (g) |
| --- | --- |
| Strontium Ferrite | 360.0 |
| Rhodofac PE510 (Rhone-Poulenc) Dispersant w 3%, or Ferrite | 10.8 |
| Dibutyl Phthalate | 429.2 |
|  | 800.0 |

Part of this dispersion is blended into the natural PCTG polyester pellets and the 50% $TiO_2$/PCTG pellets and then compounded to provide pellets of the following compositions:

|  | Percent by Weight |
| --- | --- |
| $TiO_2$ | 15.000 |
| $SrFe_{12}O_{19}$ | 0.132 |
| Rhodofac PE510 | 0.004 |
| Polyester PCTG | 84.964 |
|  | 100.000 |

These pellets are injection molded in the Van Dorn molding machine to provide cards 0.030" thick, 2" long, and 2" wide.

In order to provide additional performance features for the information cards, other additives are formulated as concentrated dispersions in a plasticizer solvent for incorporation and compounding into polymer pellets along with the magnetic particle dispersions. These dispersions are prepared using the roller mill method described above.

Rutile $TiO_2$ Dispersions

Sample A

A 20% Rutile (R-100 DuPont) dispersion in dibutyl phthalate is prepared in the following proportions by weight by placing the components in a glass walled vessel together with zirconium silicate milling media.

|  | Amount (g) |
|---|---|
| Titanium Dioxide (Rutile, R-100 DuPont) | 64.0 |
| Solsperse 24000 (Polymeric Dispersant, Zeneca Inc.) | 6.4 |
| Dibutyl Phthalate | 249.6 |
|  | 320.0 |

After milling is completed, the median particle size is 0.32 $\mu$m.

Sample B

A 35% dispersion of $TiO_2$ in dibutyl phthalate is prepared in a roller mill in similar fashion to Sample A using the following proportions:

|  | Amount (g) |
|---|---|
| $TiO_2$ (DuPont R-100) | 112.0 |
| Solsperse 24000 | 11.2 |
| Dibutyl Phthalate | 196.8 |
|  | 320.0 |

After milling, the median particle diameter is 0.31 $\mu$m.

Sample C

A 45% dispersion of $TiO_2$ in dibutyl phthalate is prepared in a roller mill in similar fashion to Sample A using the following proportions:

|  | Amount (g) |
|---|---|
| $TiO_2$ (DuPont R-100) | 144.0 |
| Solsperse 24000 | 14.4 |
| Dibutyl Phthalate | 161.6 |
|  | 320.0 |

After milling, the median particle diameter is 0.30 $\mu$m.

Alumina Abrasive Dispersions

Sample D

A 20% dispersion of Sumitomo AKP-50, $\alpha$-$Al_2O_3$ in dibutyl phthalate is prepared in the following proportions by placing the components in a glass walled vessel together with zirconium silicate milling media.

|  | Amount (g) |
|---|---|
| AKP-50 ($\alpha$-$Al_2O_3$) | 64.00 |
| Solsperse 24000 (Zeneca) | 5.12 |
| Dibutyl Phthalate | 250.88 |
|  | 320.00 |

The vessel is rolled until the median particle diameter is 0.21 $\mu$m.

Sample E

A 45% dispersion of Sumitomo AKP-15, $\alpha$-$Al_2O_3$ in dibutyl phthalate is prepared in the following proportions by placing the components in a glass walled vessel together with 700 g of zirconium silicate milling media.

|  | Amount (g) |
|---|---|
| AKP-15 ($\alpha$-$Al_2O_3$) | 144.0 |
| Solsperse 24000 | 7.2 |
| Dibutyl Phthalate | 168.8 |
|  | 320.0 |

The median particle diameter after 72 hours milling is 0.68 $\mu$m.

Dispersion of Dyes

Sample F

A 10% dispersion of the blue dye, cobalt blue $CoAl_2O_4$, is prepared with dibutyl phthalate by placing the components in the following proportions in a glass walled vessel on a roller mill with 350 g zirconium silicate milling media (0.8–1.2 mm).

|  | Amount (g) |
|---|---|
| Cobalt Blue | 16.000 |
| Solsperse 24000 (Zeneca) | 1.280 |
| Dibutyl Phthalate | 142.720 |
|  | 160.000 |

After milling, the median particle diameter is 0.47 $\mu$m.

Sample G

A 15% dispersion of cobalt blue is prepared using the following proportions:

|  | Amount (g) |
|---|---|
| Cobalt Blue | 90.0 |
| Solsperse 24000 | 7.2 |
| Dibutyl Phthalate | 502.8 |
|  | 600.0 |

After milling, the median particle size is 4.36 $\mu$m.

Sample H

A 10% dispersion of the magenta dye, Sunfast Magenta (a quinacridone pigment) in dibutyl phthalate is prepared by placing the components in the following proportions in a glass walled vessel on a roller mill together with 350 g zirconium silicate media for 3 days.

|  | Amount (g) |
|---|---|
| Magenta dye (Sunfast Magenta) | 16.00 |
| Zeneca Solsperse 24000 | 1.28 |
| Dibutyl Phthalate | 142.72 |
|  | 160.00 |

The median particle diameter of the magenta dye is 0.38 $\mu$m.

Disrersion of Nacreous Piament

Sample I

A 40% dispersion of a nacreous pigment (Mearl Corp., Mearlin Supersilk, mica/titanium dioxide) in dibutyl phthalate is prepared by placing the components in the following proportions into a glass walled vessel on a roller mill together with 800 g of zirconium silicate media (0.8–1.2 µm).

| | Amount (g) |
|---|---|
| Supersilk (Mearl Corp.) | 144.0 |
| Solsperse 24000 (Zeneca) | 7.2 |
| Dibutyl Phthalate | 208.8 |
| | 360.0 |

The dispersion is milled for 3 days at 100 rpm.

Compounding and Injection

Further examples of formulations for the preparation of filled polymer pellets for preparation of information cards are as follows:

EXAMPLE 3

Formulation of Polymer Pellets

The 45% strontium ferrite dispersion, Example 2, and the 45% rutile dispersion, Sample C, are premixed with polymer pellets in the following proportions to provide 10 kg of compounded, filled pellets.

| | Amount (g) |
|---|---|
| SrFe (w 45%) dispersion in DBuPh (Example 2) | 29.33 |
| Rutile (w 45%) dispersion in DBuPh (Sample C) | 44.44 |
| PCTG polymer (PCTG 5445) | 6986.23 |
| PCTG 50%/TiO$_2$ 50% | 2940.00 |
| | 10,000.00 |

The pellets are composed of 0.132% strontium ferrite and 14.9% rutile TiO$_2$.

EXAMPLE 4

Formulation of polymer pellets using predispositions of magnetic ferrite, titanium dioxide, and fine particles of alpha-alumina.

The 45% strontium ferrite (Example 2), the 45% titanium dioxide (Sample C) and the 20% alpha alumina (Sample D) are premixed with polymer pellets in the following manner to provide a 10 kg batch.

| | Amount (g) |
|---|---|
| SrFe (w 45% in DBuPh) (Example 2) | 29.33 |
| Rutile (w 45%) in DBuPh (Sample C) | 44.44 |
| α-Alumina (w 20%) in DBuPh (Sample D) AKP-50 | 50.00 |
| PCTG Polyester (PCTG 5445) | 6936.23 |
| 50% PCTG/50% TiO$_2$ | 2940.00 |
| | 10,000.00 |

The final percent compositions of particulates are SrFe 0.132%, AKP-50 0.1%, Rutile 14.9% in the polymer card.

EXAMPLE 5

Formulation of polymer pellets using predispersions of magnetic powder, titanium dioxide, fine particle alpha alumina and dye.

| Dispersion | Amount (g) |
|---|---|
| SrFe (w 45% in DBuPh) (Example 2) | 29.33 |
| TiO$_2$ (w 45% in DBuPh) (Sample C) | 44.44 |
| α-alumina (AKP-50 in DBuPh) (Sample D) | 50.00 |
| Cobalt Blue (w 10% in DBuPh) (Sample F) | 30.00 |
| PCTG 5445 | 6906.23 |
| 50% PCTG/50% TiO$_2$ | 2940.00 |
| | 10,000.00 |

The compounded pellets contain particles in the following percentages. SrFe—0.132%, rutile—14.9%, α-Al$_2$O$_3$—0.2%, and blue dye—0.03%.

EXAMPLE 6

Formulation of polymer pellets using predispersions of magnetic powder, titanium dioxide coarse particle alpha alumina and dye.

| Dispersion | Amount (g) |
|---|---|
| SrFe (w 45% in DBuPh) (Example 2) | 29.33 |
| TiO$_2$ (w 45% in DBuPh) (Sample C) | 44.44 |
| Coarse α-Al$_2$O$_3$(w 45% in DBuPh) (Sample E) | 44.44 |
| Cobalt Blue (D 10% in DBuPh) (Sample F) | 30.00 |
| Polyester PCTG 5445 | 6931.70 |
| Polyester 50% PCTG/50% TiO$_2$ | 2940.00 |
| | 10,000.00 | when compounded, the pellets contain particles in the following percentages: SrFe—0.132%, rutile—14.9%, αAl$_2$O$_3$ (AKP-15)—0.2% and blue dye—0.03%.

EXAMPLE 7

Formulation of polymer pellets using predispersions of magnetic powder, titanium dioxide, coarse particle Al$_2$O$_3$ (AKP-15) and dye weight basis. These mixtures are compounded and pelletized.

| Dispersion | Amount (g) |
|---|---|
| SrFe (w 45% in DBuPh) (Example 2) | 14.67 |
| TiO$_2$ (w 45% in DBuPh) (Sample C) | 44.44 |
| Coarse α-Al$_2$O$_3$(AKP-15 w 45% in DBuPh) (Sample E) | 44.44 |
| Cobalt Blue (w 15% in DBuPh) (Sample G) | 66.00 |
| Polyester PCTG 5445 | 6990.46 |
| Polyester PCTG 50%/TiO$_2$ 50% | 2840.00 |
| | 10,000.00 |

When compounded, the pellets have the following particulate components:

| | Percent (%) |
|---|---|
| SrFe | 0.066 |
| TiO$_2$ | 0.20 |
| α-Al$_2$O$_3$ (AKP-15) | 0.20 |
| Blue Dye | 0.099 |

EXAMPLE 8

Formulation of polymer pellets using predispositions of magnetic powder, coarse Al$_2$O$_3$ (AKP-15), dye and nacreous pigment (Mearl Supersilk). These mixtures are compounded and pelletized.

| Dispersion | Amount (g) |
|---|---|
| SrFe (w 45% in DBuPh) (Example 2) | 29.33 |
| Coarse $Al_2O_3$ (w 45% in DBuPh) (Sample E) | 44.44 |
| Cobalt Blue (w 15% in DBuPh) (Sample G) | 44.44 |
| Supersilk (Mica/$TiO_2$) (at 40% DBuPh) (Sample I) | 88.00 |
| PCTG 5445 polyester | 6853.79 |
| 50% polyester PCTG/$TiO_2$ 50% | 2840.00 |
| | 10,000.00 | when compounded the pellets have the following particulate components:

| | Percent (%) |
|---|---|
| SrFe | 0.132 |
| $TiO_2$ | 14.400 |
| $\alpha$-$Al_2O_3$ | 0.200 |
| Supersilk | 0.400 |
| Blue Dye | 0.132 |

EXAMPLE 9

Formulation of polymer pellets using predispersions of magnetic powder, coarse alumina (AKP-15), dye and rutile $TiO_2$ at high dye level to provide bluer hue. These mixtures are compounded and pelletized.

| Dispersion | Amount (g) |
|---|---|
| SrFe (w 45% in DBuPh) (Example 2) | 29.33 |
| Rutile (R-100 w 45% in DBuPh (Sample C) | 44.44 |
| $\alpha$-Alumina (AKP-15 w 45% in DBuPh) (Sample E) | 44.44 |
| Dye (Cobalt blue w 15% in DBuPh) (Sample G) | 106.67 |
| PCTG 5445 Polyester | 6835.12 |
| PCTG 50%/$TiO_2$ 50% | 2940.00 |
| | 10,000.00 |

When compounded, the pellets have the following particulate composition.

| | Percent (%) |
|---|---|
| SrFerrite | 0.132 |
| $TiO_2$ Rutile | 14.900 |
| $\alpha$-Alumina | 0.200 |
| Cobalt Blue | 0.160 |

The identification card according to the present invention has significant advantages over conventional I.D. cards having magnetic stripes. Data can be written on the entire surfaces or edges of the cards without the addition of a magnetic stripe. Thus, the entire surface of the card can be used for image printing. Moreover, the amount of data that can be ultimately stored on the card according to the present invention is much higher than conventional cards, even at the same data density, since many more tracks can be added. Additionally, the life of the card is substantially increased over conventional cards because the entire volume of the card would have to be worn away before the magnetic media would be gone. Conventional cards can easily have the thin magnetic stripe worn off during normal usage. A further advantage of the card of the present invention, solves two problems of the credit card industry, i.e., stray field erasure and contact duplication. It has been found that 60% of card failures are due to having the magnetic stripe erased by stray fields. This problem can be solved by using high coercivity media for the magnetic stripe; however, this makes counterfeiting or duplication easier by contact duplication on a lower coercivity media. Therefore, much of the credit card industry does not use high coercivity media. In the card of the present invention, a high (4000 Oersteds) media can be used to prevent stray field erasure without concern of contact duplication. Because the concentration of magnetic media is so low, the field from the card is too small to make duplicates on a second magnetic media.

The invention has been described in detail herein with the reference to the figures; however, it will be appreciated that variations and modifications are possible within the spirit and scope of the invention.

What is claimed is:

1. A method of making a magnetically encodable card which has magnetic particles uniformly dispersed throughout the card, the method comprising:
   a) forming a dispersion of ferromagnetic particles in an organic fluid medium,
   b) forming a composite by intimately combining the dispersion with thermoplastic resin plasticized by the organic fluid medium to uniformly disperse the magnetic particles throughout the resin, and
   c) forming the composite into an encodable card in which the particles are uniformly dispersed throughout the card.

2. The method of claim 1 wherein the ferromagnetic particles are barium ferrite, strontium ferrite or mixtures thereof.

3. The method of claim 1 wherein the dispersion contains abrasive particles.

4. The method of claim 1 wherein the dispersion contains a white pigment.

5. The method of claim 4 wherein the white pigment is $TiO_2$, $SiO_2$, $Al_2O_3$, $ZrO_2$, ZnO, $SnO_2$, $CaCO_3$ or mixtures thereof.

6. The method of claim 1 wherein the dispersion contains a dye or a colored pigment.

7. The method of claim 6 wherein the dispersion contains a blue dye.

8. The method of claim 6 wherein the dispersion contains a mixture of a blue dye and a magenta dye.

9. The method of claim 6 wherein the dispersion contains a blue pigment.

10. The method of claim 9 wherein the blue pigment is cobalt aluminate or antimony doped tin oxide.

11. The method of claim 1 wherein the magnetic particles are present in the card in an amount up to 0.1 percent by volume.

12. The method of claim 11 wherein the magnetic particles are present in the card in an amount up to 0.03 percent by volume.

13. The method of claim 1 wherein the card has a neutral reflection density.

14. The method of claim 1 wherein the ferromagnetic particles have a coercivity greater than 3000 Oe.

15. The method of claim 1 wherein the ferromagnetic particles have a coercivity greater than 4000 Oe.

16. The method of claim 1 wherein the card is formed by injection molding.

17. The method of claim 1 wherein the card is formed by extruding a sheet and punching out the card.

18. The method of claim 1 wherein an optical brightener is present in the card.

19. The method of claim 1 wherein a lubricant is present in the card.

20. The method of claim 19 wherein the lubricant is calcium stearate, zinc stearate, sodium stearate, or mixtures thereof.

21. The method of claim 1 wherein a dispersing agent is employed in the step of forming a dispersion of ferromagnetic particles in an organic fluid medium.

22. The method of claim 1 wherein an antioxidant is included in the card.

23. The method of claim 1 wherein the organic fluid medium is a phosphate ester, a glycol ester, or a phthalate ester.

24. A method of making a magnetically encodable card which has magnetic particles uniformly dispersed throughout the card, the method comprising:

a) forming a dispersion of ferromagnetic particles having a coercivity greater than 3000 Oe., the ferromagnetic particles being selected from the group consisting of barium ferrite, strontium ferrite and mixtures thereof, in an organic fluid medium selected from the group consisting of phosphate esters, glycol esters and phthalate esters;

b) intimately blending the dispersion formed in a) with a thermoplastic resin plasticized by the organic fluid medium to form a composite having up to 0.1 percent by volume of magnetic particles uniformly dispersed throught the resin; and c) forming the composite into a self-supporting encodable card in which magnetic particles are uniformly dispersed throughout the volume of the card.

* * * * *